Jan. 18, 1927. 1,615,076

E. GOODRICH

TRACTOR CLUTCH CONTROL

Filed June 25, 1925

Inventor
E. Goodrich
By
Attorney

Patented Jan. 18, 1927.

1,615,076

UNITED STATES PATENT OFFICE.

EMERY GOODRICH, OF MILFORD, MICHIGAN.

TRACTOR CLUTCH CONTROL.

Application filed June 25, 1925. Serial No. 39,544.

This invention relates to clutch controls for "Fordson" tractors, and has for one of its objects the provision of a novel and simple device of this character which may be manually operated from the seat of the tractor or from the ground and through the medium of which the clutch can be manually disengaged and latched in such condition.

A further object of the invention is the provision of a clutch control of the character stated which shall comprise comparatively few parts of simple construction and which can be readily secured to the tractor and the clutch pedal thereof.

The foregoing and other objects are attained by the construction, combination and arrangement of parts hereinafter fully described and claimed, and illustrated in the accompanying drawing, wherein:

Corresponding and like parts are referred to in the following description, and designated in the several views of the accompanying drawing, by similar reference characters.

Figure 1:
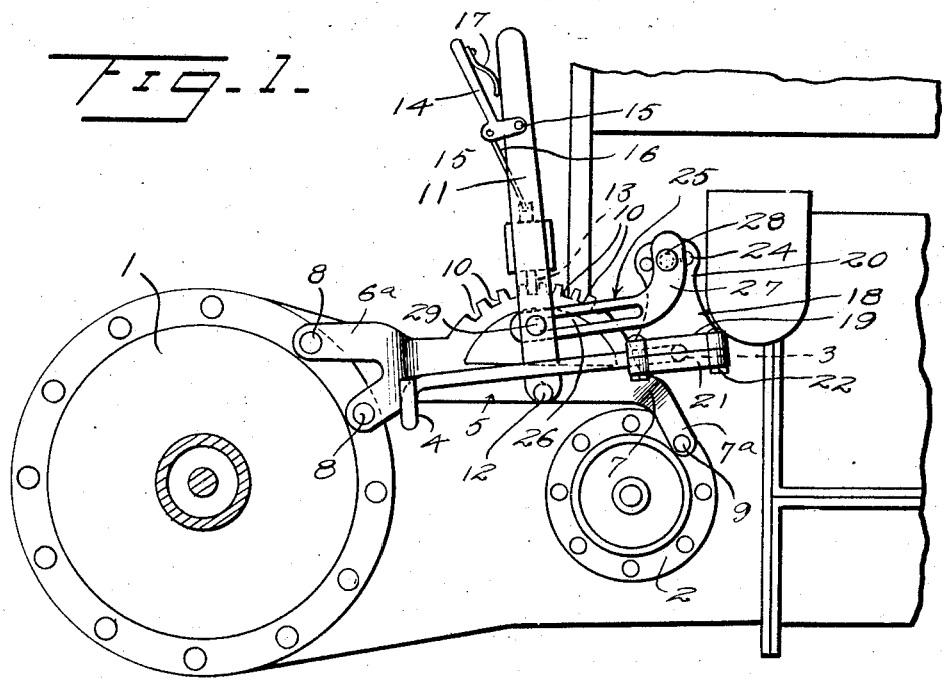
Figure 1 is an elevational view illustrating the application of the clutch control.
Figure 2:
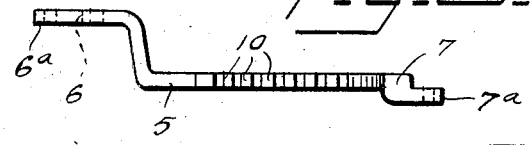
Figure 2 is a detail top plan view of the lever bracket.
Figure 3:
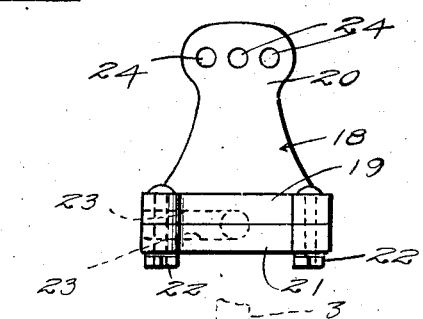
Figure 3 is a detail view in side elevation of the clutch pedal bracket.
Figure 4:
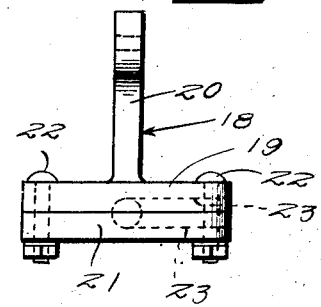
Figure 4 is a detail view in end elevation of the clutch pedal bracket.
Figure 5:
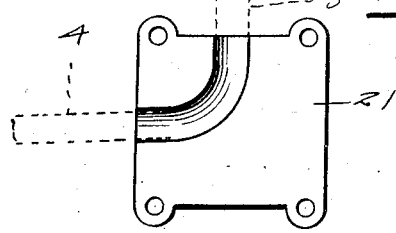
Figure 5 is a detail top plan view of the clamp plate of the clutch pedal bracket.

In the drawing 1 designates the differential housing, 2 the pulley housing, 3 the clutch shaft, and 4 the clutch pedal of a "Fordson" tractor. In this type of tractor the clutch is disengaged by depressing the pedal 4 and automatically engaged when the pedal is released, and the pedal cannot be depressed except from the seat of the tractor.

The clutch control forming the subject matter of the present invention permits the clutch to be manually disengaged from the seat of the tractor or from the ground, permits the clutch to be latched in disengaged condition, and permits the manual control of the clutch into engaged position. The device comprises a bracket 5 occupying a longitudinally extending position on the tractor in rear of the clutch shaft 3. The bracket 5 is provided at its rear end with inwardly offset lower and upper attaching lugs 6 and 6ª, respectively. The lower lug 6 extends in a downward and rearward direction from the bracket 5, and the upper lug 6ª extends horizontally from the bracket. The bracket 5 is provided at its front end with a downwardly and forwardly extending attaching lug 7 the lower end portion 7ª of which is outwardly offset. The lugs 6 and 6ª are secured to the differential housing 1 by bolts 8 and the lug 7 to the pulley housing 2 by a bolt 9. The upper end of the bracket 5 is arcuate and provided with notches 10.

A hand lever 11 is pivoted at its lower end to the bracket 5 by a bolt 12 and is provided with a slidably mounted dog 13 adapted to engage in one of the notches 10 to secure the lever in adjusted position. A latch lever 14 is pivoted as at 15 to the hand lever 11 and is connected to the dog 13 by a link 16. The latch lever 14 provides means by which the dog 13 may be disengaged from a notch of the bracket 5, and a spring 17 carried by the latch lever and contacting with the hand lever 11 provides means for holding the dog against casual displacement from the notch of the bracket.

A bracket 18 comprising a base 19 and lug 20 is secured to the clutch shaft 3 and clutch pedal 4 by means of a clamp plate 21. The clamp plate 21 is secured against the underside of the base 19 of the bracket 18 by bolts 22, and the opposing sides of the base 19 and clamp plate 21 are provided with substantially L-shaped grooves 23 for the reception of a portion of the clutch shaft 3 and a portion of the clutch pedal 4. As these portions of these parts are angularly related the bracket 18 is held against any casual movement with respect to said parts. The lug 20 extends upwardly from the base 19, and is provided adjacent its upper end with a plurality of openings 24.

A link 25 provided with a longitudinally extending slot 26 and an angular terminal 27 is connected to the lug 20 of the bracket 18 and to the hand lever 11. The link 25 is connected to the lug 20 of the bracket 18 by a bolt 28 which passes through the angular terminal 27 and through one of the openings 24, and to the hand lever 11 by a bolt 29 carried by the lever and extending through the slot 26.

The connection between the hand lever 11 and the clutch disengaging mechanism is such that when the lever is pulled rearwardly the clutch will be disengaged. The hand lever 11 will be latched in the position into which it is moved by the dog 13 engaging in one of the notches 10 of the bracket 5 with the result that the clutch will be secured in disengaged condition. When it is desired to engage the clutch the hand lever 11 is swung forwardly and it is releasably held in this position by the dog 13. As the link 25 has a pivot and slot connection with the hand lever 11, the clutch may be controlled through the medium of the pedal 4 when the hand lever is in the latter of the stated positions. The openings 24 of the lug 20 of the bracket 18 permit the pivot 28 of the link 25 to be adjusted forwardly or rearwardly with respect to the vertical axis of the pivot 12 of the hand lever 11. The hand lever 11 can be readily operated from the seat of the tractor or the ground, and due thereto the clutch may be controlled from the ground while the tractor is being used to drive a belt.

After backing the tractor to position the pulley thereof in contact with the belt, the hand lever 11 can be swung to disengage the clutch and lock it in such condition, and by doing this the tractor may be blocked without separating the gears. The clutch control permits the tractor to be started by hand with greater ease than is possible with the foot pedal 4. Furthermore, the clutch control permits the tractor to be readily handled while coupling it to a trailer, farm implement or the like, and permits the tractor to be brought to a stop without disengaging the gears.

The advantages of the construction and of the method of operation of the clutch control should be readily apparent to those skilled in the art to which it appertains. While I have described the principle of operation of the clutch control, together with the structure which I now consider to be the best embodiment thereof, I desire to have it understood that the structure shown is merely illustrative, and that such changes may be made as are within the scope of the invention as claimed.

What is claimed is:

1. A tractor clutch control, comprising a plate forming a bracket adapted to be secured to the tractor, said bracket being provided at one end with inwardly offset attaching lugs and at its other end with an outwardly offset attaching lug, the bracket being provided with notches at its upper edge, a second bracket adapted to be secured to the clutch pedal and having an upstanding portion, a lever pivoted to the first bracket and provided with a dog for engagement in one of said notches, and a link connected to the upstanding portion and lever.

2. A tractor clutch control, comprising a plate forming a bracket adapted to be secured to the tractor, said bracket being provided at one end with inwardly offset attaching lugs and at its other end with an outwardly offset attaching lug, the bracket being provided with notches at its upper edge, a second bracket adapted to be secured to the clutch pedal and having an upstanding portion, a lever pivoted to the first bracket and provided with a dog for engagement in one of said notches, and an L-shaped link, said link having one arm provided with an elongated slot, a pivot element passing through said slot and connected to the lever, and the other arm of the link being connected to said upstanding portion.

In testimony whereof I affix my signature.

EMERY GOODRICH.